United States Patent
Chen et al.

(10) Patent No.: US 10,996,185 B2
(45) Date of Patent: May 4, 2021

(54) IN SITU CHEMICAL SENSING ELECTRODE RECONDITIONING

(71) Applicant: CALIFORNIA INSTITUTE OF TECHNOLOGY, Pasadena, CA (US)

(72) Inventors: Samson Chen, Pasadena, CA (US); Axel Scherer, Pasadena, CA (US); Muhammad M. Jilani, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 422 days.

(21) Appl. No.: 15/601,503

(22) Filed: May 22, 2017

(65) Prior Publication Data

US 2017/0336340 A1  Nov. 23, 2017

Related U.S. Application Data

(60) Provisional application No. 62/340,124, filed on May 23, 2016.

(51) Int. Cl.
*G01N 27/30* (2006.01)
*G01N 27/327* (2006.01)

(52) U.S. Cl.
CPC ......... *G01N 27/3274* (2013.01); *G01N 27/30* (2013.01)

(58) Field of Classification Search
CPC ........ G01N 27/30–3274; G01N 27/403–4145; G01N 33/0031; G01N 33/5438; G01N 27/27; C12Q 2565/607; C12Q 1/001–006; Y10S 435/817; G02F 2201/12; G02F 2201/1357; H01M 4/00–02; H01M 4/0438–0445; H01M 2004/023–029
See application file for complete search history.

(56) References Cited

U.S. PATENT DOCUMENTS

| | | | | |
|---|---|---|---|---|
| 3,462,353 | A * | 8/1969 | Every | C25B 11/04 205/727 |
| 5,147,806 | A * | 9/1992 | Kamin | G01N 21/76 422/52 |
| 5,405,522 | A * | 4/1995 | Braden | G01N 27/301 204/412 |
| 6,683,446 | B1 * | 1/2004 | Pope | B01J 19/0046 205/81 |

FOREIGN PATENT DOCUMENTS

WO  WO-0020855 A1 *  4/2000  ......... G01N 27/3277

OTHER PUBLICATIONS

J. Wang, et al. "In situ electrochemical renewal of glassy carbon electrodes", Analytical Chemistry, 60(5), p. 499-502, Mar. (Year: 1988).*

(Continued)

*Primary Examiner* — J. Christopher Ball
(74) *Attorney, Agent, or Firm* — Steinfl + Bruno, LLP

(57) ABSTRACT

A cycle of positive and negative voltage pulses applied to an electrode sensor removes passivation of an electrode surface. The conditioned sensors have improved sensitivity to concentrations for analytes of interest. The electrode surfaces can also be passivated on purpose to reduce sensitivity. The voltages applied are varied according to the solution present.

18 Claims, 9 Drawing Sheets

(56) References Cited

OTHER PUBLICATIONS

M. Mujeeb-U-Rahman, et al. "Micro/Nano Patterned Integrated Electrochemical Sensors for Implantable Application", Proceedings of the Nanotech'13, p. 134-137 (Year: 2013).*

X.-M. Chen, et al. ("Recent advances in electrochemiluminescent enzyme biosensors", Trends in Analytical Chemistry, 30(5): p. 665-676, May (Year: 2011).*

Han, et al., "Solid-State Reference Electrodeposited Nanoporous Platinum for Microchip", Electroanalysis, 19(7-8): p. 786-792, April (Year: 2007).*

* cited by examiner

IN SITU CHEMICAL SENSING ELECTRODE RECONDITIONING

CROSS REFERENCE TO RELATED APPLICATIONS

The present application claims priority to U.S. Provisional Patent Application No. 62/340,124, filed on May 23, 2016, the disclosure of which is incorporated herein by reference in its entirety.

STATEMENT OF INTEREST

This invention was made with government support under Grant No. HR0011-15-2-0050 awarded by DARPA. The government has certain rights in the invention.

TECHNICAL FIELD

The present disclosure relates to chemical sensors. More particularly, it relates to in situ reconditioning of electrodes that form part of electrochemical sensors sensing hydrogen peroxide, glucose, and other target analytes.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

SUMMARY

Figure 1:
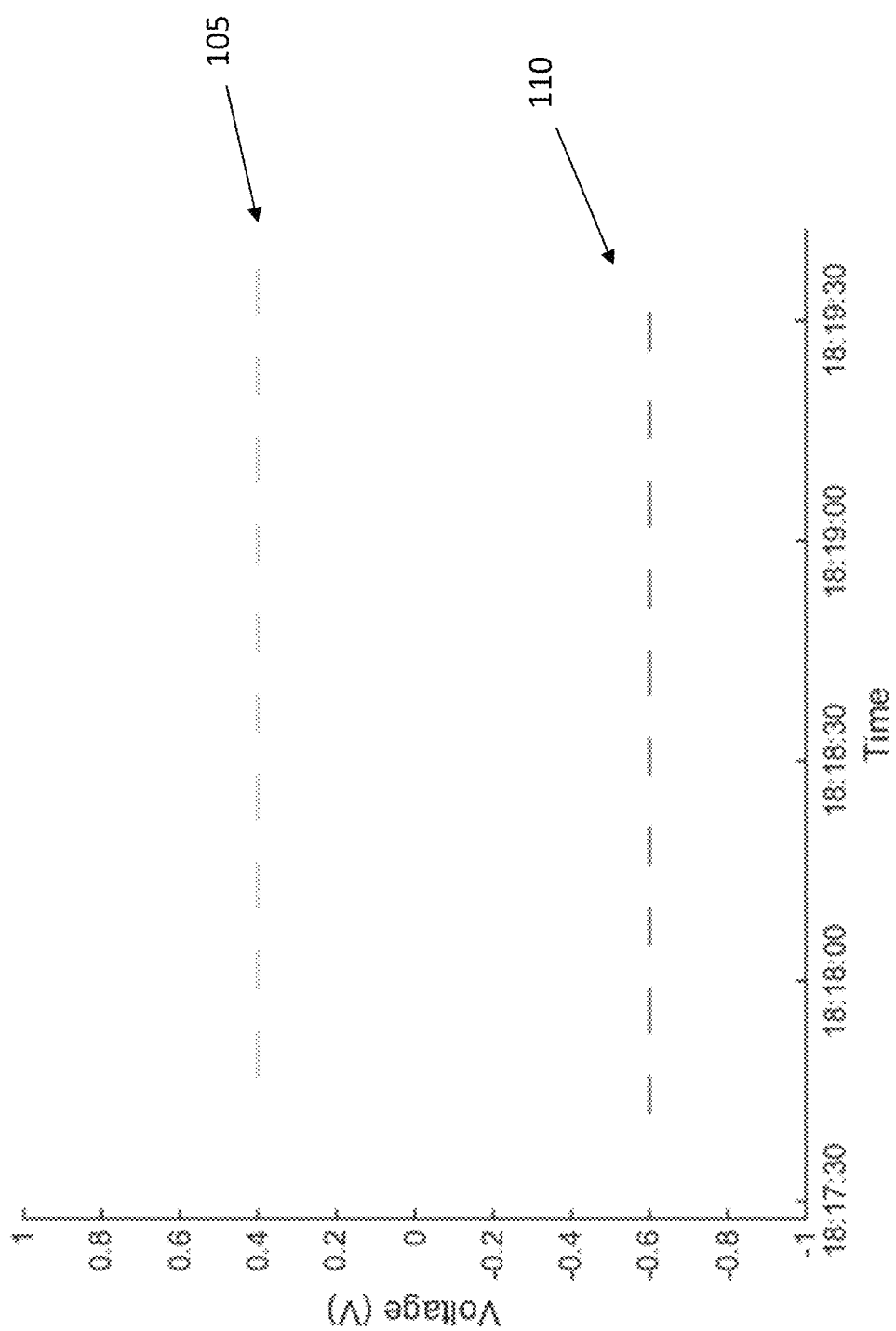
FIG. 1 illustrates voltage profile during conditioning.

In a first aspect of the disclosure, a method is described, the method comprising: providing a sensor in a liquid, the sensor having at least one electrode having a surface in contact with the liquid; and applying a conditioning voltage to the at least one electrode to remove a passivation layer from said surface.

In a second aspect of the disclosure, a method is described, the method comprising: providing a sensor in a liquid, the sensor having at least one electrode having a surface in contact with the liquid and at least one platinum reference electrode; applying a conditioning voltage pulse to at least one electrode to remove a passivation layer from said surface; and applying a measuring voltage pulse to at least one electrode, subsequently to the conditioning voltage pulse, to measure a concentration of a target analyte in the liquid, wherein the conditioning voltage pulse is negative with respect to the platinum reference electrode, and the measuring voltage pulse is positive with respect to the platinum reference electrode.

In a third aspect of the disclosure, a method is described, the method comprising: providing a sensor, the sensor having at least one electrode and at least one platinum reference electrode; and applying a passivating voltage pulse to the at least one electrode to generate a passivation layer on said surface; wherein the passivating voltage pulse is positive with respect to the platinum reference electrode.

DETAILED DESCRIPTION

Many implantable biosensors utilize electrochemical sensing techniques to measure the concentration of small molecules in the human body. In some cases, these biosensors directly measure an electroactive compound, such as nitric oxide. In other cases, the analyte of interest is indirectly measured using an enzyme which produces an electroactive compound, such as hydrogen peroxide, which is then measured by an electrochemical sensor. In any case, the long term performance and initial repeatability of the electrochemical sensor are critical to the lifetime and usability of the implant.

Often a limiting factor is degradation of the surface of these electrochemical sensors. In addition to ordinary fouling by the human body, chemical modification of the surface is possible. For some analytes, high measurement voltages are required to reliably detect species of interest or to increase signal levels to measurable levels. At these measurement voltages, some metal surfaces used in electrochemical sensors, such as gold, platinum, or iridium, may slowly oxidize due to ions present in the human body, most notably oxygen and chloride, forming a passivating layer on the surface. This layer increases the impedance of the electrode, reducing the relative signal levels of the analyte of interest, and drastically changing the scaling of the sensor. In practice, because it may not be possible to recalibrate sensors in-situ, and because the rate of degradation of the sensor is typically unpredictable, this change in scaling results in a substantial reduction in the accuracy of the sensor. Eventually, the reduction in accuracy can become so great that the implant can no longer be medically used, shortening the lifetime of the implant. Additionally, in some cases, this passivation of the surface can occur as a side effect during the manufacture of the device, resulting in substantial variations between manufactured devices. Such variations in fabrication, in turn, can affect system accuracy, as implant electronics typically need to be optimized for a very specific measurement range.

In implantable sensors designed to operate over a very long term, a three electrode electrochemical sensor may be used. In electrochemical sensors, the potential applied is used to improve selectivity towards a particular electroactive species. In two-electrode systems, the effective chemical potential may shift as the electrode surfaces described above degrade, affecting not only the scaling of the electrochemical signal but also the selectivity of the device. Three-electrode systems use a third "reference electrode" that does not carry a current, and thus does not degrade as quickly as a two electrode systems. However, this third electrode will still slowly passively degrade over time, typically through chemical changes to the surface.

Reference electrodes are often made using systems comprising silver and silver chloride (Ag—AgCl electrodes). However, these electrodes can degrade over time in physiological environments, and may be more difficult to manufacture in some processes. Alternative electrodes, such as platinum, gold or iridium, can passivate over time, possibly resulting in unstable performance. However, some of these electrodes can perform quite well in a three-electrode system, when their passivation is maintained, as low electrode impedance is actually unimportant (and possibly undesirable) in a three electrode sensor.

The passivation on many electrode surfaces can be removed by applying an appropriate sequence of biasing voltages in an appropriate solution. An AC signal is commonly applied to electrochemical sensors in a highly acidic bath to condition them before use. However, the present disclosure describes how it is possible to reproducibly condition electrode surfaces, such as platinum, using a controlled pulse of DC voltage. In the case of platinum, passivating oxides and chlorides can be removed using a pulse of reverse voltage on an electrode, typically from −0.2 V with respect to the standard hydrogen electrode in human physiological solutions, drastically decreasing the impedance of the electrode. It should be noted that the exact potentials used can vary, as the electrochemical reaction behind this conditioning process is dependent on the composition of solution. For example, the appropriate voltages are typically higher without the presence of halide (such as chloride) or phosphate ions, and lower in higher concentrations of halide ions when a platinum surface is used. Overall, the voltage used can range anywhere from −0.6 to 1.0 V with respect to the standard hydrogen electrode. It will be understood by those skilled in the art that the physical voltage used to affect this process in an actual sensor can be shifted appropriately based on the nature and composition of the reference electrode, which is itself sometimes dependent on the solution. For example, in human physiological ion concentrations, when a platinum reference electrode is used, −0.6 V is commonly used as the reverse voltage, which is equivalent to −0.2 V with respect to the standard hydrogen electrode. In general, the methods described herein are not limited by the choice of reference electrode.

In some embodiments, the application of the DC voltage is carried out in the presence of specific molecules or atoms, such as physiological ions (ions commonly present physiologically), oxygen, chloride, and hydrogen peroxide.

The application of the DC voltage can be carried out in a variety of different ways, such as using a square wave having pulses lasting for specific times. For example, a pulse may be an amount of time between 0 seconds and 5 minutes, including, for example, 1 s, or 5 s, or 1 min. The DC voltage can be interspersed with measurement cycles, and done in situ, such as in an implant, or in a solution being measured (e.g. in vitro), to continually regenerate the electrode surface. In other words, the typical measurement voltage slowly passivates the surface, while the application of the DC regenerating voltage obviates the drawbacks of the measurement cycle. The two processes can be alternated as necessary to prolong the life of the sensor.

The DC voltage may also be applied during or immediately after fabrication, in order to regenerate the electrode, which may for example have been passivated as a consequence of the fabrication processes.

Additionally, in the case of three terminal systems, where a reference electrode needs to be kept stable, a reverse process can be carried out. In other words, the electrode may be passivated on purpose. The present disclosure describes that positive voltages can quickly passivate specific metal surfaces, such as platinum, when a voltage of −0.6 to 1.0 V with respect to the standard hydrogen electrode is applied. This voltage can passivate the platinum surface in the presence of physiological ions. In the case of platinum, the Pt/PtOx system can provide a very stable reference electrode, if the oxide passivation layer is maintained. In this embodiment, the reference electrode can be maintained in its passivated state by having passivation cycles interspersed between measurement cycles, creating a reference electrode that can be effectively more stable than many traditional chemistries, including Ag/AgCl electrodes.

The present disclosure therefore describes a method of reconditioning whereby a potential or sequence of potentials is used to restore an electrode to a known state, where the electrode is part of an electrochemical sensor and where the reconditioning is performed with minimal disruption to its measurement processes while in its measurement environment.

In some embodiments, the potential used is between −0.6 to 1.0 V with respect to the standard hydrogen electrode, pulsed at 5 s, 1 s, 5 min at intervals from 0 seconds to 5 minutes. The electrode material can be for example platinum, iridium, or gold. The known state can be a metal surface stripped of any oxide or chloride passivation. For example, 1 to 10 square wave cycles can be applied.

In some embodiments, the potential used is between −0.6 to 1.0 V with respect to the standard hydrogen electrode, pulsed at intervals from 0 seconds to 1 minute. The reference electrode material can be platinum or gold. The known state can be a metal surface deliberately passivated by an oxide or chloride.

In some embodiments, the sensor is an implantable device, and the measurement environment is the human body. The method requires no explanation of the sensor. The method can be applied interspersed between measurement cycles, minimally affecting normal operation. In some embodiments, the electrode conditioning utilizes ions present in the human body to restore the electrode to a known state.

As discussed above, the present disclosure describes a method for conditioning the surface of electrochemical sensors. The method, when applied to sensors with poor or degraded surface conditions, strips the surface of any passivation layers and increases the sensitivity of the sensors. The conditioning protocol works in a wide variety of conditions and with the sensors immersed in a variety of solutions, including hydrogen peroxide solutions (in PBS, phosphate-buffered saline), plain PBS (commonly used to simulate physiological ion concentrations), and ultra-pure water. The conditioning protocol works also when the sensor is coated with enzymes (e.g., glucose oxidase) and immersed in a solution of the analyte of interest (e.g., a glucose solution in PBS). The methods described herein can also be applied to deliberately passivate a surface.

In some embodiments, the electrode surface can be stripped of passivation to improve sensitivity by applying a potential between −0.6 to 1.0V with respect to the standard hydrogen electrode. In some embodiments, the voltage typically applied as part of the conditioning protocol is −0.6 V with respect to the platinum reference electrode in the sensors. In some embodiments, platinum is used as a reference electrode in the sensors.

In some embodiments, it is possible to measure hydrogen peroxide concentrations by applying a voltage of typically 0 to 0.6 V with respect to the platinum reference electrode. The choice of measurement voltage is dependent on the application. Specifically, it depends on the desired sensitivity, which improves with higher voltages, and the desired ability to reject compounds other than hydrogen peroxide, which improves with lower voltages. Additionally, the desired measurement voltage changes with ion concentration and composition. As such, a wide range of measurement voltage is possible. An exemplary measurement voltage of 0.4 V will be used for further examples. By applying brief pulses of −0.6 V to condition the electrodes, with brief measurements at 0.4 V interspersed between the pulses, it is possible to see the sensitivity of the electrode rise with each successive pulse, with possibly asymptotic behavior towards a maximum value. These exemplary values for the applied voltages and the time duration of the pulses are illustrated in FIG. 1. In FIG. 1, the 0.4 V (105) measurement pulses and the −0.6 V conditioning pulses (110) are illustrated.

In some embodiments, the pulses can be applied for extended periods of time, while in other embodiments the conditioning voltage is pulsed for brief periods of time. In fact, a substantial part of the conditioning appears to occur in the first fraction of a second of the first negative pulse.

In some embodiments, the conditioning pulse is at −0.6 V for 5 seconds, while measuring pulses are at 0.4 V for 5 seconds. This cycle can be repeated, for example 10 times. For example, a single pulse at −0.6 V can be followed by a pulse at 0.4 V, before repeating the two pulses a number of times.

Figure 2:
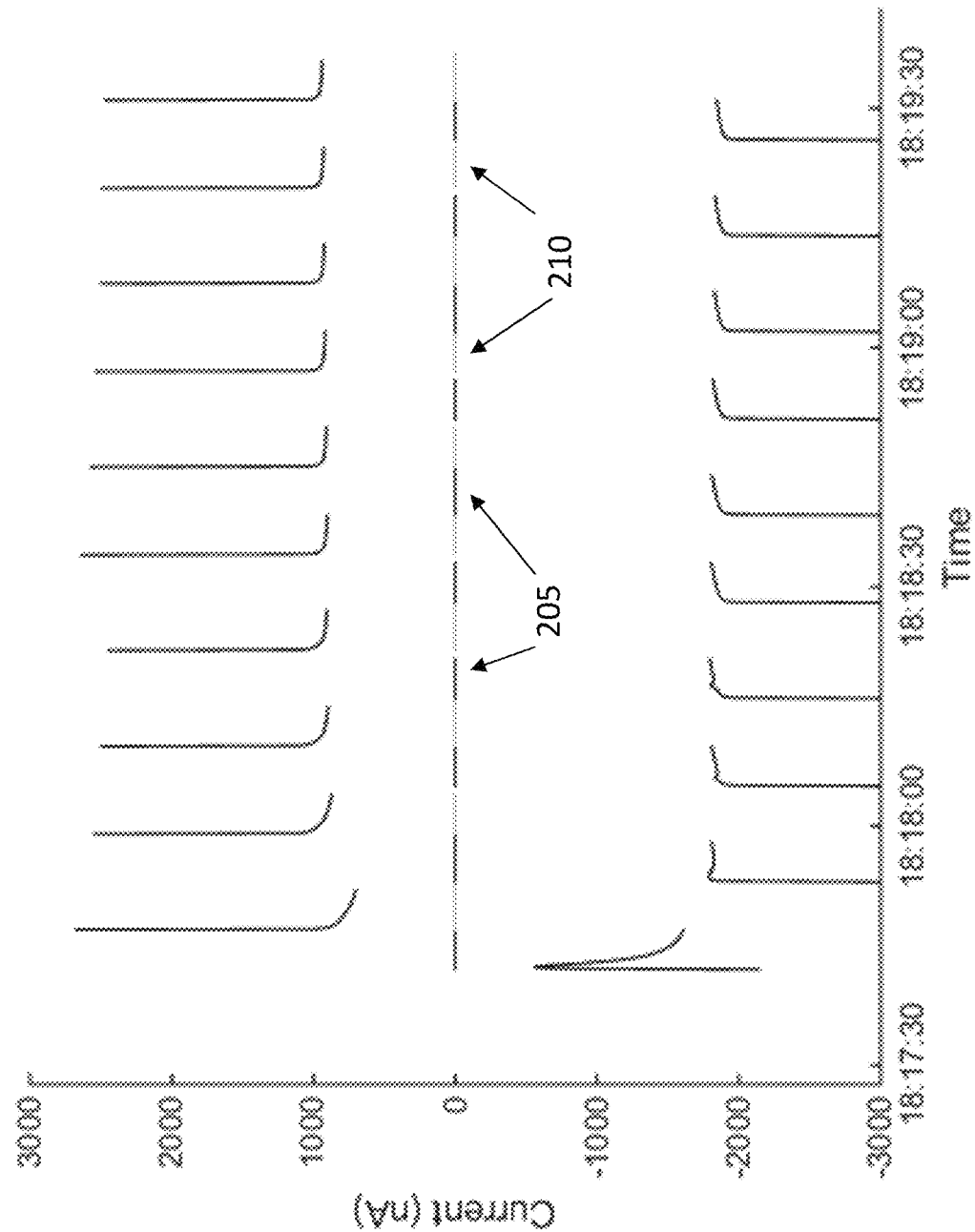
FIG. 2 illustrates a current profile while conditioning in 0.8 mM hydrogen peroxide.

FIG. 2 illustrates measurements of currents during the negative (conditioning, 205) and positive (measurement, 210) parts of the protocol. FIG. 2 illustrates the magnitude of currents in both parts of the protocol rising with subsequent cycles. The sensitivity of the sensor in FIG. 2 improved when applying the above method. The current profiles of FIG. 2 were measured while conditioning in 0.8 mM hydrogen peroxide in PBS. However, other solutions may be used.

Figure 3:
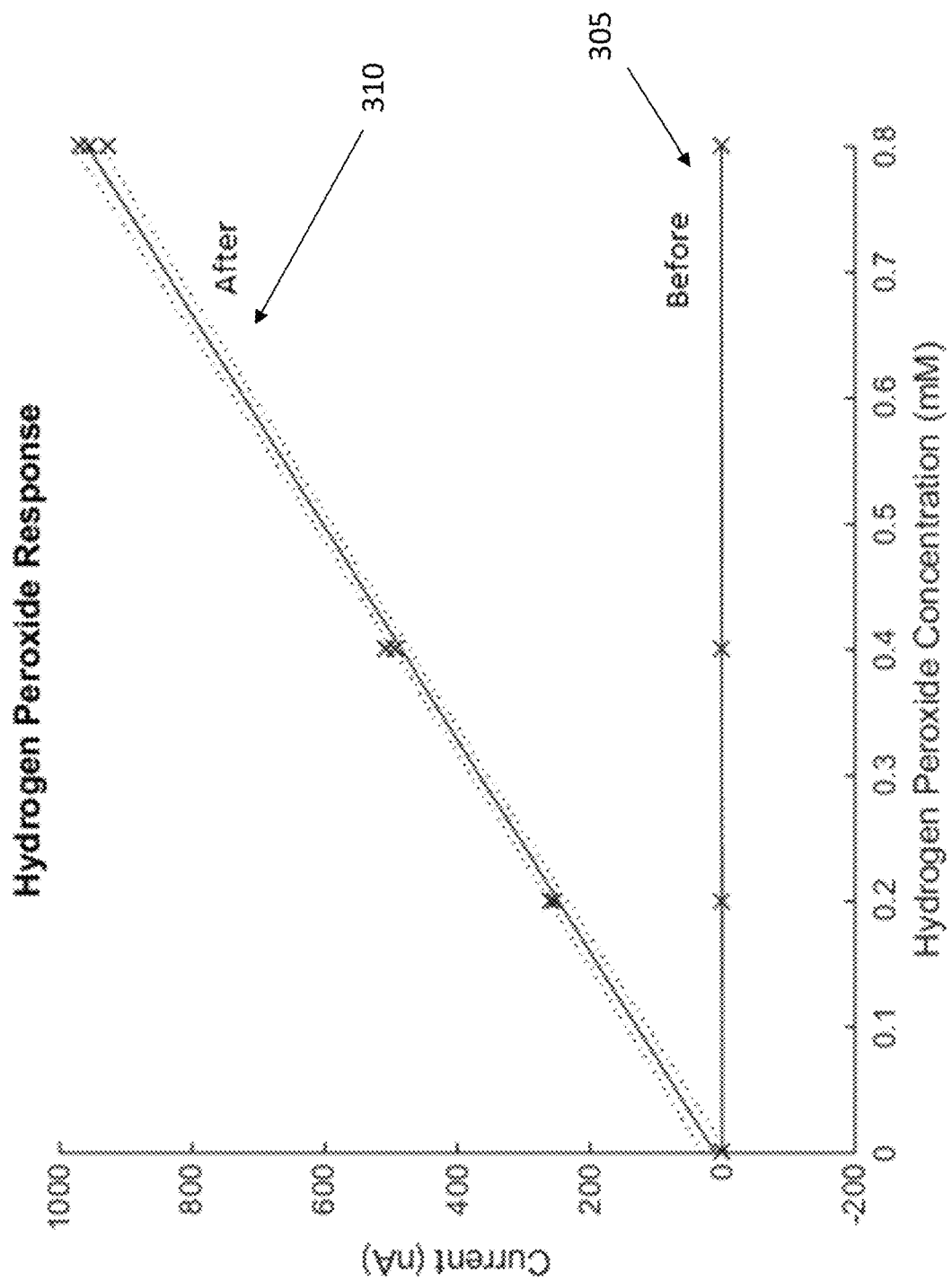
FIGS. 3-4 illustrate the sensitivity before and after conditioning.
Figure 4:
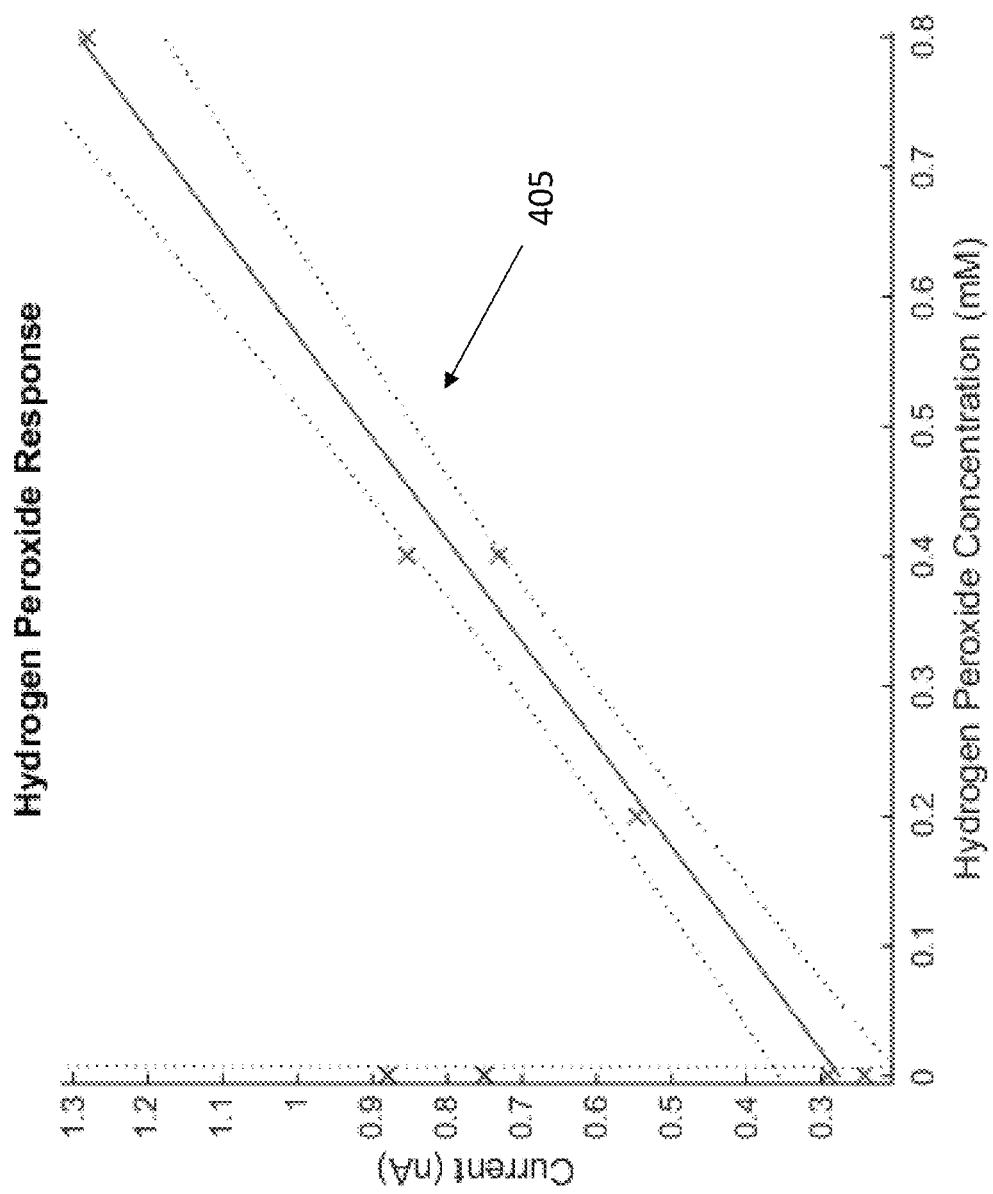

FIG. 3 illustrates the sensor response to the hydrogen peroxide concentration, before (305) and after (310) conditioning. A clearly improved response can be noted after conditioning. FIG. 4 illustrates how, even before conditioning, the sensor still had a (very low) linear response to the hydrogen peroxide concentration (405). The sensor appears "dead" only in FIG. 3, in comparison to the conditioned sensor. The "before" graph of FIG. 4 is a zoomed in part of FIG. 3.

In some embodiments, conditioning can be carried out in the presence of enzymes. To demonstrate this embodiment, two sensors, placed on one wafer, were tested. The two sensors had never been conditioned before and were drop-coated with glucose oxidase. The sensors were conditioned after coating using the protocol described above in the present disclosure, while immersed in a glucose solution. The two sensors showed a dramatic improvement in sensitivity. While these sensors were being conditioned, two other sensors that had previously been at least partially conditioned a week earlier were also reconditioned. The sensitivity on these improved as well.

Figure 5:
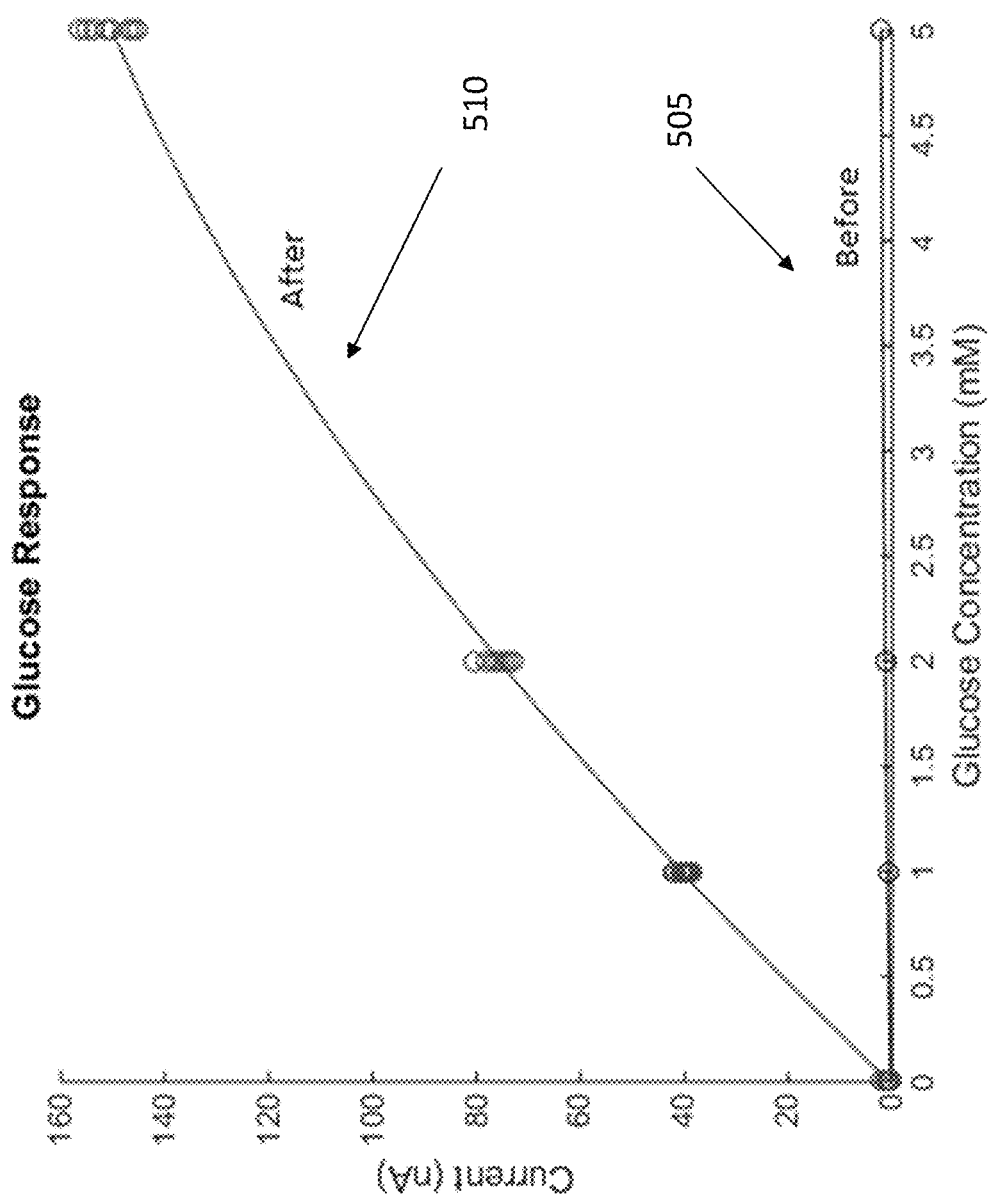
FIGS. 5-6 illustrate the sensors' response to glucose concentration after conditioning the never-before conditioned sensors under enzyme.
Figure 6:
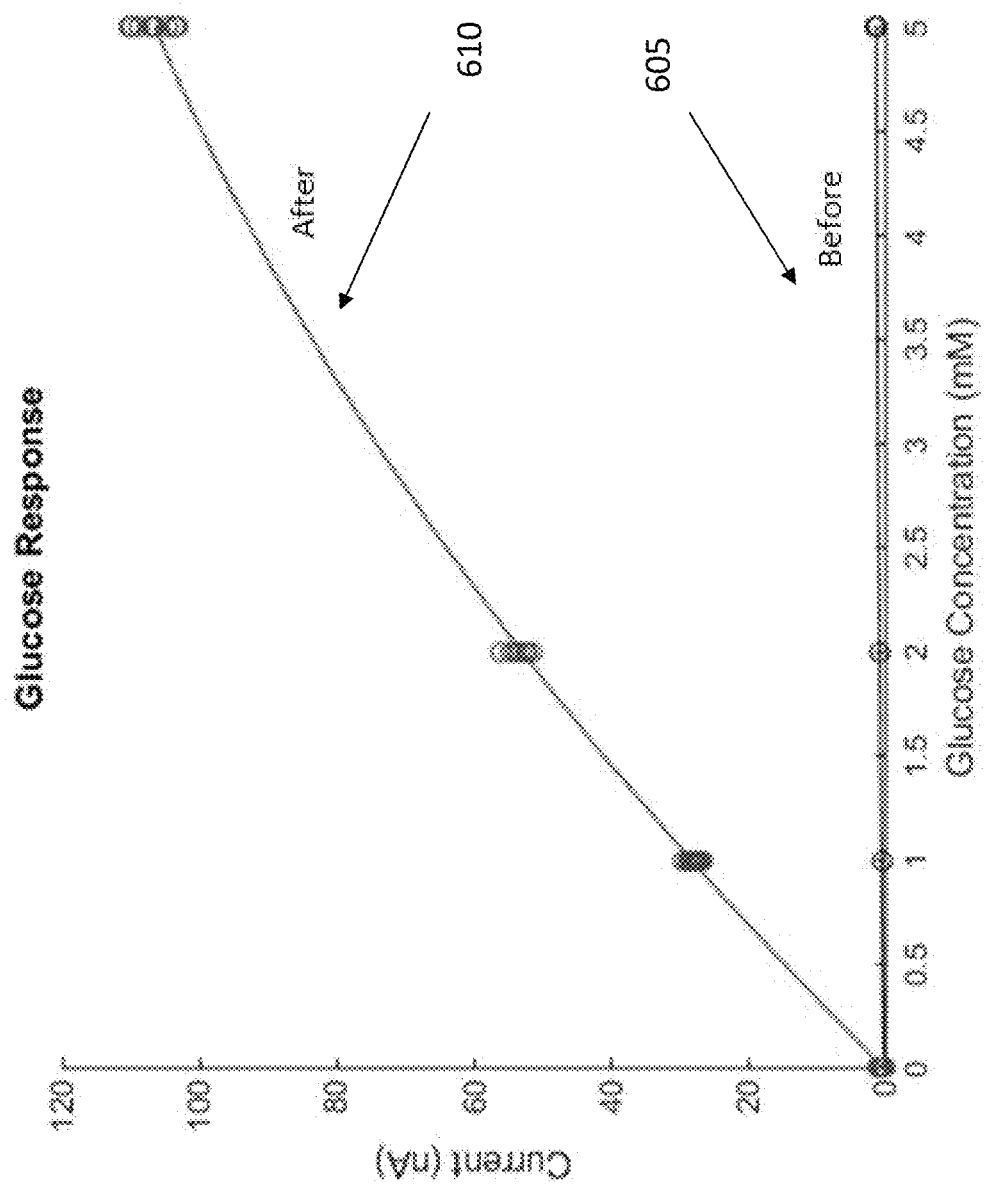

FIGS. 5-6 illustrate the sensors' response to glucose concentration after conditioning. The two sensors are never-before conditioned sensors under enzyme, before (505, 605) and after (510, 610) conditioning.

Figure 7:
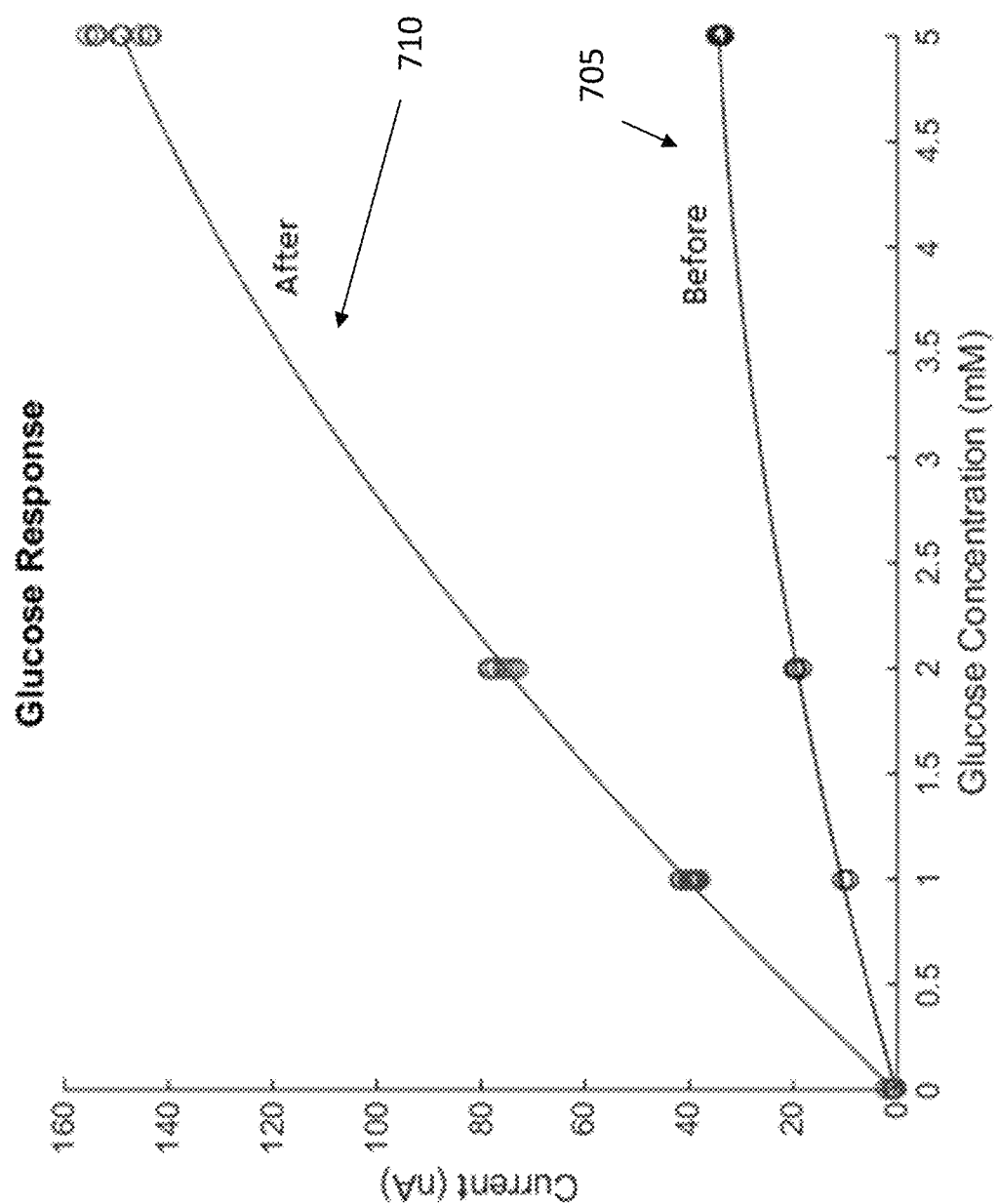
FIGS. 7-8 illustrate the sensors' response to glucose concentration after reconditioning.
Figure 8:
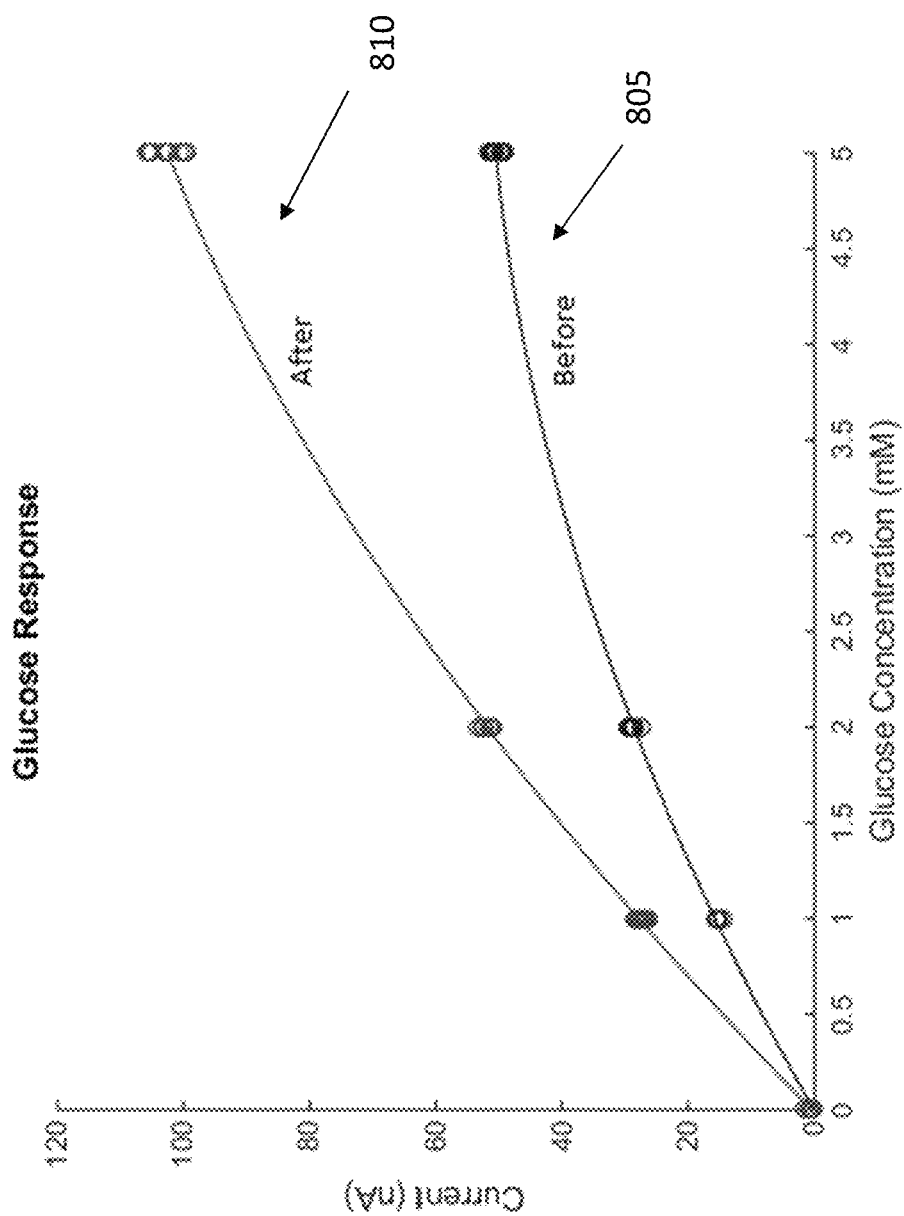

FIGS. 7-8 illustrate the sensors' response to glucose concentration after reconditioning. The reconditioned two sensors are previously conditioned sensors on which the surface had degraded, under enzyme. The curves are before (705,805) and after (710,810) reconditioning. It can be noted that the response of the previously conditioned sensors is improved with respect to the sensors that have never been conditioned. However, reconditioning can still improve the sensitivity of the sensors.

Figure 9:
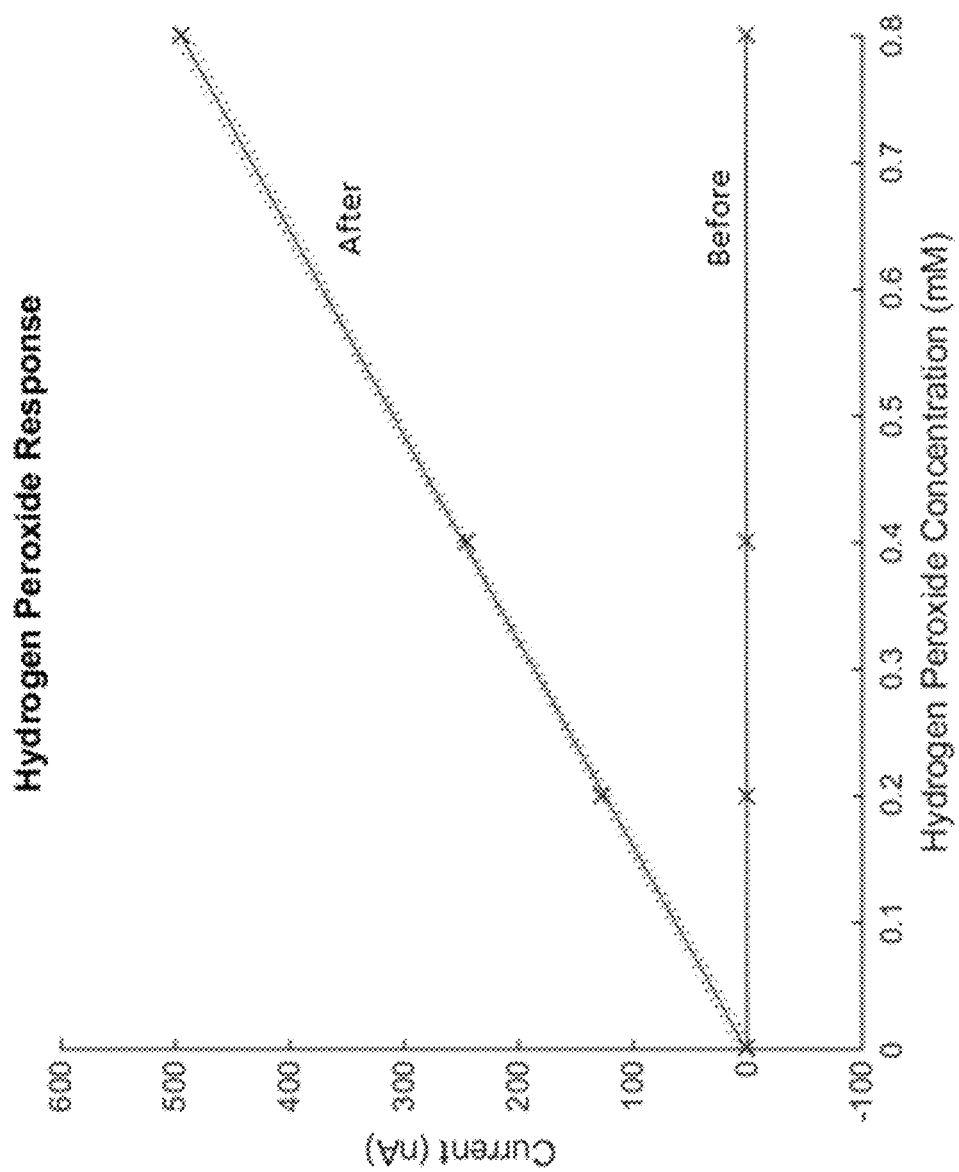
FIG. 9 illustrates results of conditioning in ultra-pure water.

In some embodiments, conditioning can be carried out with hydrogen peroxide solution in PBS and glucose solution in PBS. In other embodiments, conditioning can be carried out in plain PBS, hydrogen peroxide solution in ultra-pure water, and in plain ultra-pure water, or other solutions. FIG. 9 illustrates the response of a sensor to the hydrogen peroxide concentration in ultra-pure water. Ultra-pure water refers to high-purity water from which organic and inorganic impurities as well as dissolved and particulate matter have been removed to the highest standards of purity. It may contain dissolved oxygen at room temperature and pressure.

In some embodiments, applying a large positive potential (e.g. 1 V with respect to the platinum reference electrode) deliberately passivates the electrodes and reduces sensitivity. This can be a useful effect as controlled passivation can put the sensor in a known state with a known sensitivity. For example, some amplifiers may be unable to measure extremely large currents from a particularly sensitive electrode, and deliberate passivation may be able to keep measurement currents within the amplifier measurement range.

In some embodiments, as described above, the method is applied to sensors in a liquid environment. As known to the person of ordinary skill in the art, a silver chloride electrode is a type of reference electrode, often used in electrochemical measurements. This type of electrode can be used as an internal reference electrode and it is often used as reference in reduction potential measurements.

As known to the person of ordinary skill in the art, the standard hydrogen electrode is a redox electrode used in the thermodynamic scale of oxidation-reduction potentials. The absolute electrode potential of the standard hydrogen electrode is estimated to be 4.44±0.02 V at 25° C., but to form a basis for comparison with all other electrode reactions, hydrogen's standard electrode potential is set to be zero volts at all temperatures. The potentials of other electrodes are compared with that of the standard hydrogen electrode at the same temperature.

A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

What is claimed is:

1. A method comprising:
    providing a sensor in a liquid, the sensor comprising at least one electrode having a surface in contact with the liquid, and a platinum reference electrode;
    applying a conditioning voltage to the at least one electrode to remove a passivation layer from said surface, wherein the conditioning voltage is a pulse of DC voltage with controlled DC voltage amplitude and controlled pulse length, and
    maintaining a passivation layer on a surface of the platinum reference electrode by applying a passivating voltage to the platinum reference electrode, thereby providing a more stable platinum reference electrode,
    wherein the passivating voltage is a pulse of DC voltage with controlled DC voltage amplitude and controlled pulse length, and
    wherein the controlled DC voltage amplitude of the conditioning voltage is in a range between −1.0 to 0.6 volts with respect to the platinum reference electrode.

2. The method of claim 1, wherein the pulse length of the conditioning voltage lasts for 5 seconds.

3. The method of claim 1, further comprising applying a measuring pulse of 0 to 0.6 volts with respect to the platinum reference electrode to the at least one electrode to measure a concentration of a target analyte in the liquid.

4. The method of claim 3, wherein the applying the conditioning voltage followed by the applying the measuring pulse is carried out repeatedly in a cycle.

5. The method of claim 4, wherein the cycle comprises at least 10 repetitions.

6. The method of claim 1, wherein the at least one electrode has been previously conditioned.

7. The method of claim 3, wherein the liquid is phosphate-buffered saline or ultra-pure water, and the target analyte is glucose or hydrogen peroxide.

8. The method of claim 7, wherein the at least one electrode is coated with an enzyme.

9. The method of claim 8, wherein the enzyme is glucose oxidase.

10. A method comprising:
    providing a sensor in a liquid, the sensor having at least one electrode having a surface in contact with the liquid and at least one platinum reference electrode that is maintained in a passivated state;
    applying a conditioning voltage to the at least one electrode to remove a passivation layer from said surface, wherein the conditioning voltage is a pulse of DC voltage with controlled DC voltage amplitude and controlled pulse length;
    applying a measuring voltage pulse to the at least one electrode, subsequently to the conditioning voltage, to measure a concentration of a target analyte in the liquid, and
    maintaining a passivation layer on a surface of the platinum reference electrode by applying a passivating voltage to the platinum reference electrode, thereby maintaining the passivated state,
    wherein the passivating voltage is a pulse of DC voltage with controlled DC voltage amplitude and controlled pulse length, and
    wherein the DC voltage amplitude of the conditioning voltage is negative with respect to the platinum reference electrode, and the measuring voltage pulse is positive with respect to the platinum reference electrode.

11. The method of claim 10, wherein the DC voltage amplitude of the conditioning voltage is −1.0 to 0.6 volts with respect to the platinum reference electrode and the measuring voltage pulse is 0 to 0.6 volts with respect to the platinum reference electrode.

12. The method of claim 11, wherein the pulse length of the conditioning voltage and a pulse length of the measuring voltage pulse are each 5 seconds long.

13. The method of claim 12, wherein the applying of the conditioning voltage followed by the applying of the measuring voltage pulse is repeated at least 10 times.

14. The method of claim 10, wherein the at least one electrode has been previously conditioned.

15. The method of claim 10, wherein the liquid is phosphate-buffered saline or ultra-pure water, and the target analyte is glucose or hydrogen peroxide.

16. The method of claim 15, wherein the at least one electrode is coated with an enzyme.

17. The method of claim 16, wherein the enzyme is glucose oxidase.

18. A method comprising:
    providing a sensor in a liquid, the sensor comprising at least one electrode and at least one platinum reference electrode; and
    applying a passivating voltage to the at least one platinum reference electrode to generate a passivation layer on a surface of the at least one electrode, wherein the passivating voltage is a pulse of DC voltage with controlled DC voltage amplitude and controlled pulse length;
    interspersing the applying with measurement cycles of the terminal sensor, the measurement cycles to measure a concentration of a target analyte in the liquid; and
    based on the interspersing, maintaining the passivation layer and obtaining more stable measurement results,
    wherein the DC voltage of the passivating voltage is positive with respect to a voltage at the platinum reference electrode.

* * * * *